(12) United States Patent
Chapman et al.

(10) Patent No.: US 6,785,301 B1
(45) Date of Patent: Aug. 31, 2004

(54) METHOD AND APPARATUS FOR CONDUCTING CALL WAITING-CALLER IDENTIFICATION IN A PACKET SWITCHED NETWORK

(75) Inventors: John T. Chapman, Cupertino, CA (US); Mark Bakies, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 752 days.

(21) Appl. No.: 09/607,182

(22) Filed: Jun. 29, 2000

(51) Int. Cl.[7] .................................................. H04J 3/12
(52) U.S. Cl. ..................... 370/522; 370/401; 370/352; 370/410; 370/426; 379/142.08; 379/88.21; 379/215.01
(58) Field of Search ..................... 379/142.01, 142.02, 379/142.04, 142.06, 142.08, 88.21, 215.01, 93.17, 93.23, 245, 207.15, 207.01, 207.03, 207.13; 370/522, 352, 236, 401, 410, 426, 496

(56) References Cited

U.S. PATENT DOCUMENTS

| | | | | |
|---|---|---|---|---|
| 6,078,581 A | * | 6/2000 | Shtivelman et al. | 370/352 |
| 6,101,246 A | * | 8/2000 | Heinmiller et al. | 379/142.01 |
| 6,317,488 B1 | * | 11/2001 | DePond et al. | 379/93.35 |
| 6,339,639 B1 | * | 1/2002 | Henderson | 379/142.08 |
| 6,418,210 B1 | * | 7/2002 | Sayko | 379/142.15 |
| 6,614,781 B1 | * | 9/2003 | Elliott et al. | 370/352 |

* cited by examiner

Primary Examiner—Dong Ton
Assistant Examiner—Tri H. Phan
(74) Attorney, Agent, or Firm—Marger Johnson & McCollom, PC

(57) ABSTRACT

The invention uses a novel signaling protocol for conducting call waiting-caller ID messaging. Instead of waiting for an acknowledge back from the caller ID box, an acknowledge signal is generated locally at a gateway. This allows the packet switched network to meet the timing requirements of the circuit switched network. The gateway tricks the central office switch into believing an actual acknowledge signal was sent from the caller ID box. The central office switch accordingly sends the caller ID information. This ID information is then propagated across the IP network to the caller ID box.

26 Claims, 5 Drawing Sheets

METHOD AND APPARATUS FOR CONDUCTING CALL WAITING-CALLER IDENTIFICATION IN A PACKET SWITCHED NETWORK

BACKGROUND

The invention relates generally to Call Waiting-Call Identification on a telephone network and more particularly to providing call waiting-caller ID in a packet switched network.

Call waiting-caller ID is used to notify a user currently on a first call of a waiting second phone call to the same phone number (call waiting). A telephone may be off-hook and connected to a first phone call. When there is another incoming call to that telephone number, a central office switch sends two consecutive call waiting indication signals. If the telephone is attached to a caller ID box, that caller ID box sends back an acknowledgement signal to the central office switch after receiving the first call waiting indication signal. If the central office switch hears this acknowledge signal from the caller ID box within a certain amount of time, it will send tones to the caller ID box that represent the name and number of the second caller.

The user can then look at the second calling party name displayed on the caller ID box before deciding whether to flash hook to the second call. If the user generates a flash hook signal before the central office generates the second indication signal, the user is connected to the second party. If the user does not generate a flash hook signal before the second indicate signal, the central office terminates the second call.

The central office uses Frequency Shift Keying (FSK) signals for sending the information about the second caller to the caller ID box. To prevent the user from hearing all of these FSK signals, the caller ID box temporarily breaks the downstream voice path between the central office switch and the user's telephone. The central office switch will not send the FSK signals unless the calling party ID box replies with an acknowledgement signal. This prevents FSK signals from reaching a telephone that does not have a caller ID box. After the FSK signals have been transmitted from the central office to the caller ID box, the voice path is reestablished.

For this call waiting-caller ID feature to work, the caller ID box must respond to the indication signal within a predetermined amount of time. This time period however is less than the round trip time currently provided by Voice Over Internet Protocol (VoIP) equipment. Specifically, VoIP equipment used in High Speed Fiber Cable (HFC) networks take too much time to forward the indication signal from the central office switch to the caller ID box and then return the acknowledge signal from the ID box back to the central office switch. This timing limitation prevents circuit switched caller ID protocols, such as GR-303, from being used in packet switched networks.

The present invention addresses this and other problems associated with the prior art.

SUMMARY OF THE INVENTION

The invention uses a novel signaling protocol for conducting call waiting-caller ID messaging. Instead of waiting for a remote acknowledge back from the caller ID box, an acknowledge signal is generated locally at the IP network gateway. This allows the packet switched network to meet the timing requirements of the circuit switched network. The gateway essentially tricks the central office switch into believing an actual acknowledge signal was sent from the caller ID box. The central office switch accordingly sends the caller ID information which is then propagated across the IP network to the caller ID box. The invention allows integration of the circuit switched network signaling standards, such as GR-303 signaling standard, into packet switched networks.

DETAILED DESCRIPTION

Figure 1:
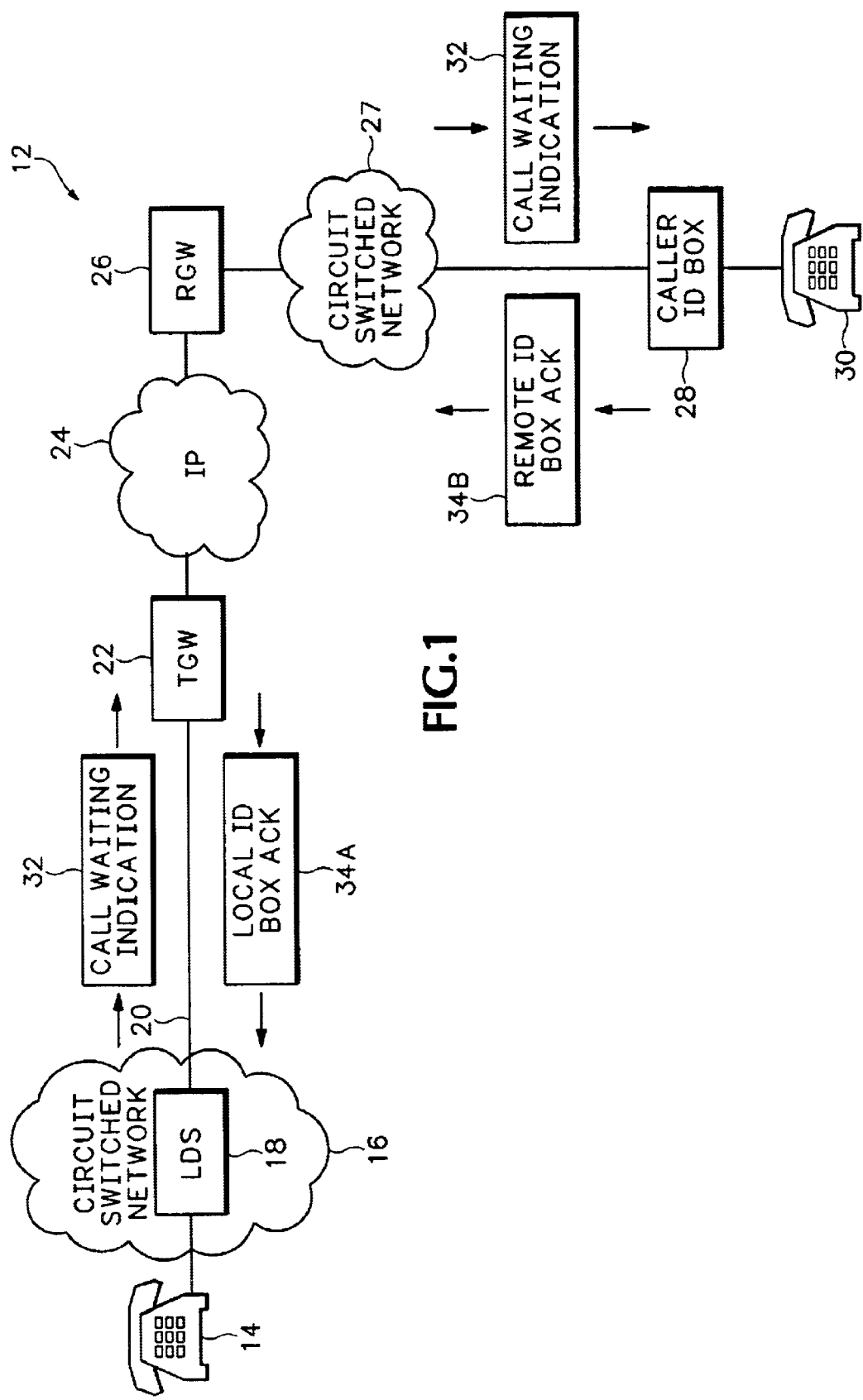
FIG. 1 is a block diagram showing how local call waiting-caller ID acknowledge is performed according to the invention.

FIG. 1 shows a communications network 12 according to the invention. A phone 14 is connected to a circuit switched network 16. For example, the circuit switched network 16 may be a Plain Old Telephone Service (POTs) network, a Public Service Telephone Network (PSTN), Integrated Services Digital Network (ISDN) or any combination of these circuit switched networks. A class five telephony switch 18 is referred to as a Local Digital Switch (LDS). The LDS 18 in the circuit switched network 16 connects to a Truck Gateway (TGW) 22 through a T1 line 20. The TGW 22 packetizes Time Division Multiplexed (TDM) voice signals from the T1 line 20 into Voice over Internet Protocol (VoIP) packets and sends the packetized voice over an Internet Protocol (IP) network 24. A Residential Gateway (RGW) 26 is connected to the IP network 24 and converts the VoIP packets back into TDM voice signals. The voice signals are sent over another part of the circuit switched network 27 to telephone 30.

A calling party ID box 28 (caller ID box) is connected to telephone 30. The caller ID box 28 is used to notify a user of telephone 30 of a waiting second phone call while phone 30 is already off-hook with a first call. When phone 30 is off-hook and there is a second incoming call, LDS 18 sends a call waiting indication signal 32A to phone 30. Instead of the LDS 18 waiting to receive a remote acknowledge signal 34B from caller ID box 28, TGW 22 generates a local caller ID box acknowledge (ACK) signal 34A.

By sending the ACK signal 34A locally at the TGW 22, the IP network 24 can meet the timing requirements of the circuit switched network 16. The Trunk Gateway 22 essentially tricks the LDS 18 into believing an actual acknowledge signal was sent from the caller ID box 28. The LDS 18 accordingly sends caller ID information such as the name and phone number for the second calling party. This ID information is then propagated across the IP network 24 to the caller ID box 28.

Figure 2:
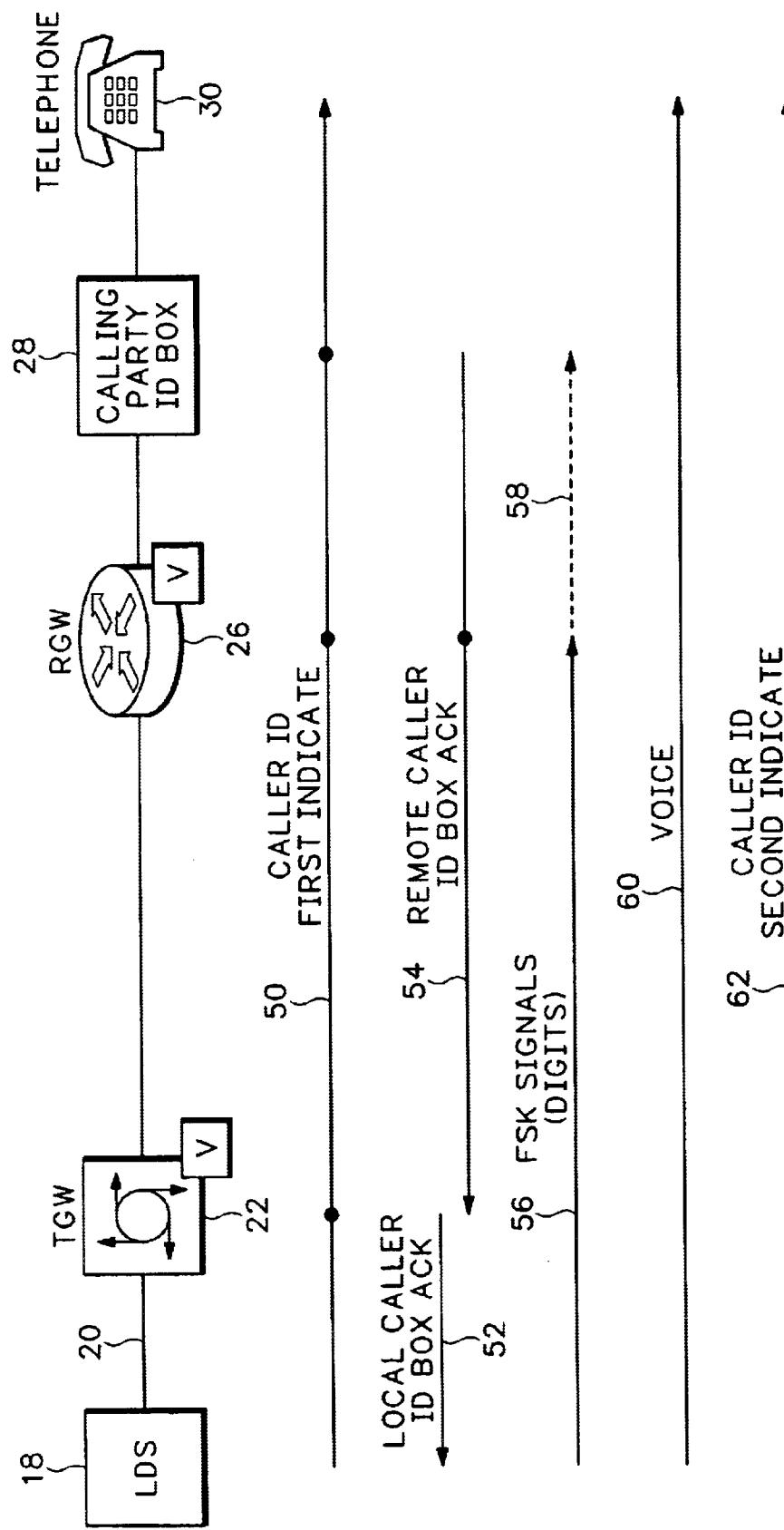
FIG. 2 is a signaling diagram showing how call waiting-caller ID signaling is conducted according to the invention.

FIG. 2 shows a more detailed description of the communications network shown in FIG. 1. A first caller ID indicate signal 50 is sent by the LDS 18 indicating a second call to telephone 30. There is some maximum time period allowable from the time the indicate signal 50 is first sent until an acknowledge signal must be received by the LDS 18. If the acknowledge signal is received within this time period, the LDS 18 will send Frequency Shift Keying (FSK) signals 56 that identify the name and phone number of the second calling party.

After acknowledging the first indicate signal 50, the caller ID box 28 breaks the downstream voice path to the telephone 30 while the FSK signals 56 are being transmitted. Breaking the voice path refers to stopping the transfer of voice packets either in the upstream direction (toward LSD 18) or in the downstream direction toward telephone 30. This prevents a user of telephone 30 from hearing the FSK signals 56. When all the FSK signals 56 have been transmitted, the voice path 60 is reestablished between the calling party ID box 28 and the telephone 30. The LDS 18 then sends a second indicate signal 62 when the time for hook flashing to the second call has expired.

The invention generates a local caller ID acknowledge signal 52. This local acknowledge protocol is enabled in the TGW 22 and the RGW 26. After the first indicate signal 50 is detected by the TGW 22, the TGW 22 waits some amount of time and then responds to LDS 18 with the local caller ID box acknowledge (ACK) signal 52. This local ACK signal 52 is generated by the TGW 22 and does not come from the caller ID box 28. Thus, the TGW 22 tricks the LDS 18 into thinking the ACK signal 52 came from the caller ID box 28. The amount of time TGW 22 waits before sending the local caller ID box ACK signal 52 is configurable. In one embodiment, the response time is configured to be about 100 milliseconds (msec). The response time is chosen to be equal to or longer than the response time of the caller ID box so that the caller ID box will not receive digits before it is ready. This response time can be varied for different communications networks.

While the TGW 22 is simulating the caller ID box ACK signal 52, the caller ID first indicate signal 50 propagates to the RGW 26, the caller ID box 28 and to the telephone 30. Upon detecting the first indicate signal 50, the caller ID box 28 generates the actual caller ID box ACK signal 54. This actual ACK signal 54 in one embodiment propagates back through the RGW 26 to the TGW 22. In the mean time, the TGW 22 has broken the upstream voice path to prevent the remote caller ID box ACK signal 54 (actual ACK signal) from reaching the LDS 18. This prevents the remote ACK signal 54 from confusing the LDS 18.

Alternatively, the upstream voice path could be broken by the RGW 26 to prevent the remote acknowledge 54 from reaching the LDS 18. The TGW 22 or RGW 26 monitor the incoming voice packets for the end of the remote caller ID box ACK signal 54. After detecting the end of the ACK signal 54, the upstream voice path is reestablished.

Voice packets coming from the IP network carry voice signals and the tones representing the remote ACK signal 54. These voice packets are monitored by a Digital Signal Processor (DSP) in the TGW 22 or RGW 26. This DSP breaks the voice path by preventing the decoded voice packets from being output by a codec. (See FIG. 5).

The LDS 18 upon receiving the local ACK signal 52, sends the FSK signals 56 in the downstream voice path to the caller ID box 28. The TGW 22 and the RGW 26 constantly monitor for the first indicate signal 50. The RGW 26 upon detecting the first indicate signal 50, monitors for the remote ACK signal 54 from the caller ID box 28. If the RGW 26 detects the ACK signal 54 from the caller ID box 28, the RGW 26 allows the FSK signals 56 from the LDS 18 through to the caller ID box 28. This is represented by dashed line 58. The FSK signals 56 again represent the name and phone number of the calling party. These FSK signals are converted into digits that are displayed on the caller ID box 28.

If there was no remote ACK signal 54 detected by the caller ID box 28, RGW 26 breaks the downstream voice path preventing the FSK signals 56 from reaching telephone 30. This prevents the FSK signals 56 from reaching phone 30 when there is no caller ID box 28.

When the FSK signal 56 burst is over, or alternatively after a time out period, the RGW 26 reestablishes the downstream voice path 60 to telephone 30. Voice communication is then reestablished to telephone 30. Then a second indicate signal 62 is allowed to go through to telephone 30.

Figure 3:
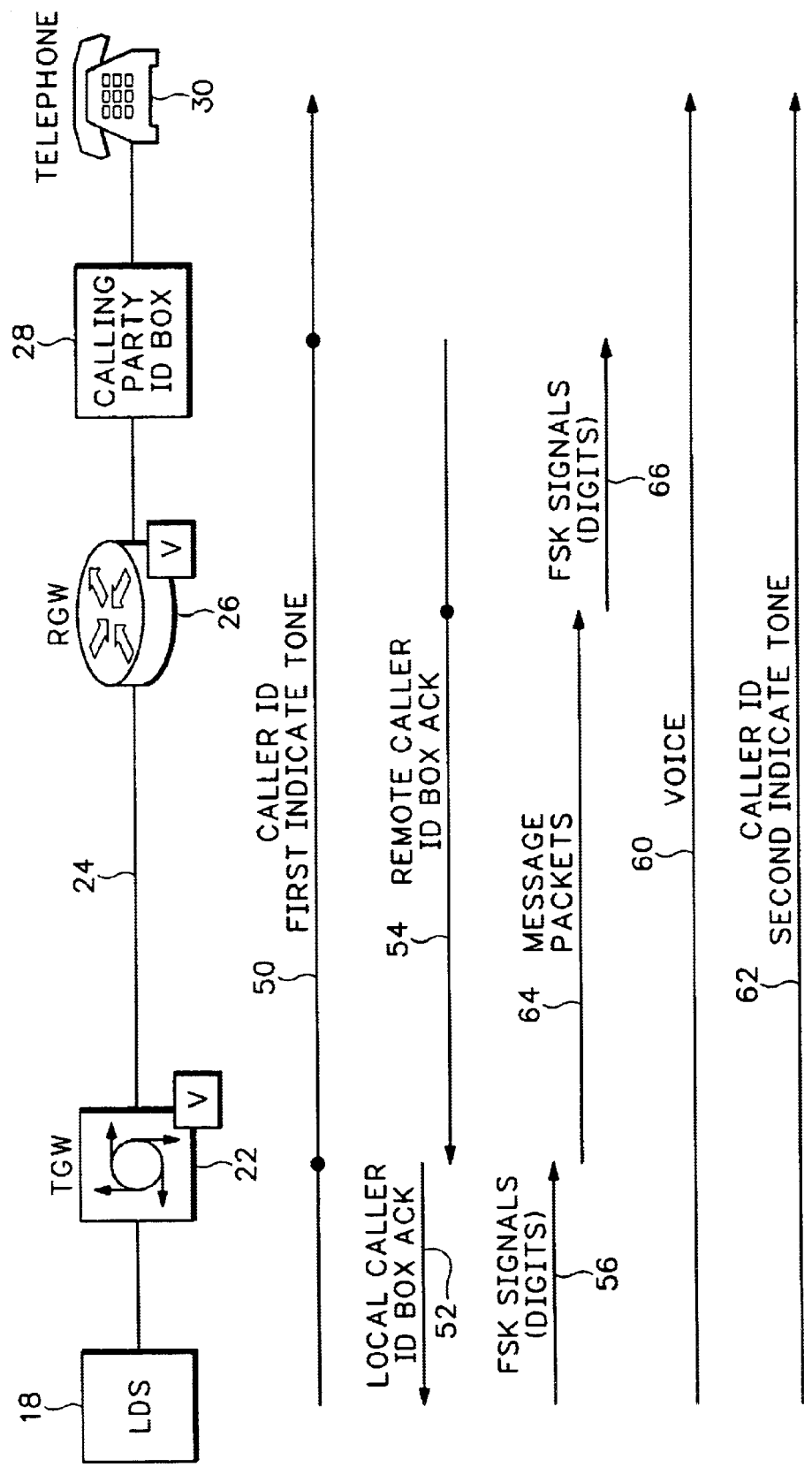
FIG. 3 is a signaling diagram showing a call waiting-caller ID signaling scheme according to another embodiment of the invention.

FIG. 3 shows another embodiment of the invention. In FIG. 2, the FSK signals 56 representing the calling party name and phone number are passed through the TGW 22 and the RGW 26 directly to the calling party ID box 28. In FIG. 3, the TGW 22 collects the FSK signals 56, converts the FSK signals 56 into digits and formats these digits into an IP message packets 64.

The TGW 22 only sends the message packets 64 to the RGW 26 when the TGW 22 detects the remote ACK signal 54 from the caller ID box 28. The RGW 26 then converts the message packets 64 back into FSK signals 66 representing the digits of the calling party name and phone number. There may not be a remote ACK signal 54 generated by the caller ID box 28. For example, there may not be a caller ID box connected to telephone 30. In this case, TGW 26 will not send the message packets 64 to RGW 26. Alternatively, TGW 26 sends the message packets but RGW 26 does not decode those message packets into FSK signals and forward the FSK signals to telephone 30.

When the LDS 18 has completed sending the FSK signals 56, the downstream voice path 60 is reestablished to telephone 30. The second indicate signal 62 is then allowed to propagate to the telephone 30 to indicate when the hook flash response time has timed out.

The different acknowledge and voice path control functions described above can be moved between the TGW 22 and the RGW 26. The indication and acknowledge signals described are typically FSK tones but can by any signaling protocol used in telephone networks, such as Dual Tone Multiple Frequency (DTMF) signaling.

Figure 4:
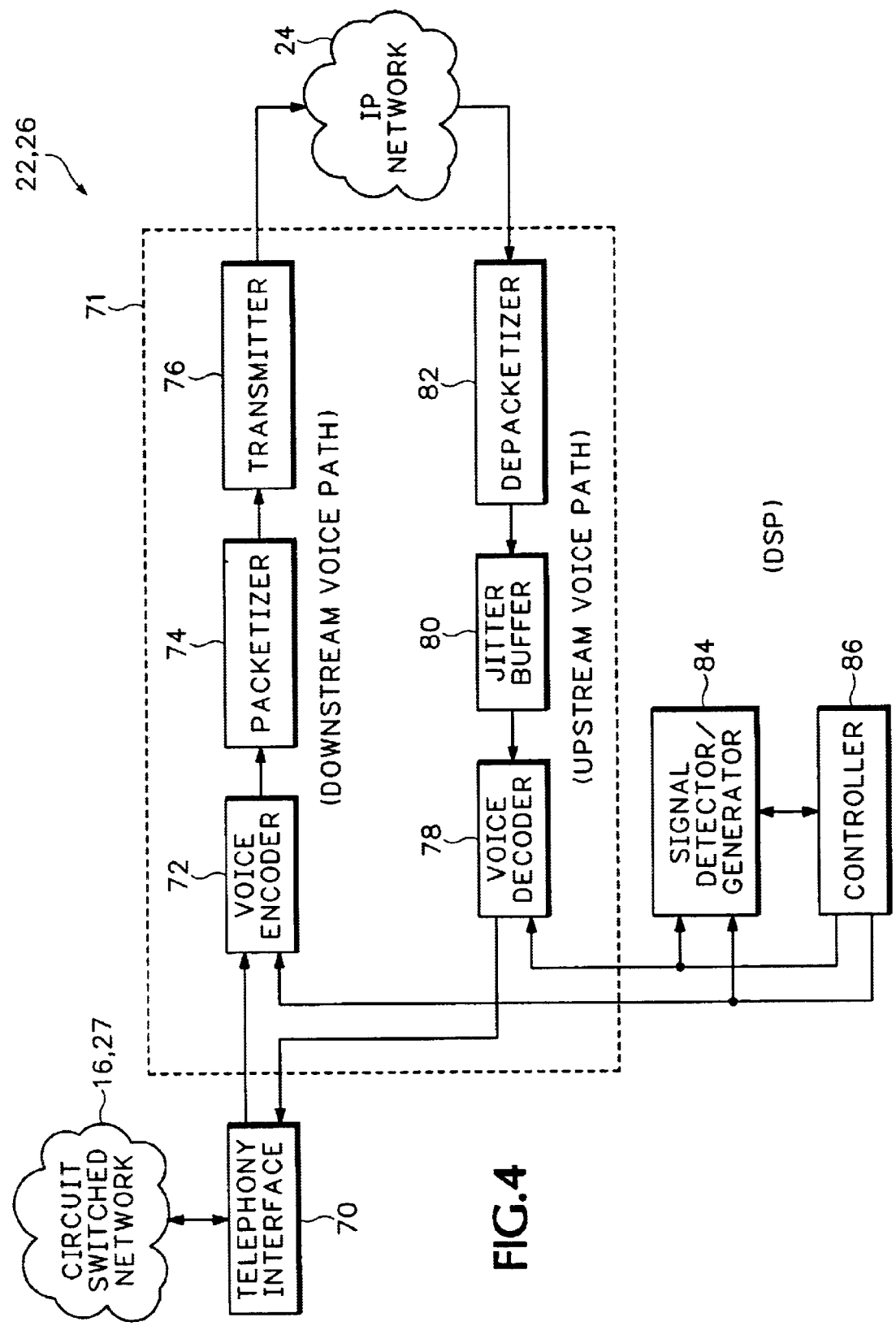
FIG. 4 is a block diagram showing functional components in a Trunk Gateway and a Residential Gateway used for conducting call waiting-caller ID signaling according to the invention.

FIG. 4 is a detailed diagram showing some of the local functions in the TGW 22 and RGW 26 (gateway). The gateway includes a telephony interface 70. In the case of the TGW 22, the telephony interface 70 typically connects to a T1 line and in the case of the RGW 26 the telephony interface 70 typically connects to a POTS line connected to a residence.

A downstream voice path of a VoIP interface 71 includes a voice encoder 72, a packetizer 74, and a transmitter 76. The voice encoder 72 implements the compression half of a codec. Packetizer 74 accepts compressed audio data from encoder 72 and formats the data into VoIP packets for transmission over the VoIP network 24. Transmitter 76 places the VoIP packets from packetizer 74 onto the IP network 24.

An upstream voice path of the VoIP interface includes a depacketizer 82 that accepts packets from the IP network 24 and separates out audio frames. A jitter buffer 80 buffers the audio frames and outputs them to a voice decoder 78 in an orderly manner. The voice decoder 78 implements the decompression half of the codec employed by voice encoder 72 (second half of codec). The decoded audio frames (TDM audio signals) are then output through the telephony interface 70 to the circuit switched network 16 or 27. The circuitry used for transmitting and receiving audio packets in the telephony interface 70 and VoIP interface 71 are well known and, therefore, not described in further detail.

The gateway includes signal detector/generator software 84 and controller software 86 that conducts the local caller ID ACK protocol described above. The signal detector/generator 84 detects the indicate signal 50, the caller ID box acknowledge signal 54 and the FSK signals 56 (FIG. 2). The controller 86 directs the detector/generator 84 to generate the local ACK signals when the first indicate tone is generated. Controller 86 also connects or disconnects the upstream or downstream voice paths of the IP interface 71 as described above according to the signals detected by signal detector/generator 84.

The blocks shown in FIG. 4 represent different operations performed in the gateway. These operations may be implemented in the same or different hardware circuitry or may be implemented in software code performed in one or more Digital Signal Processors.

Figure 5:
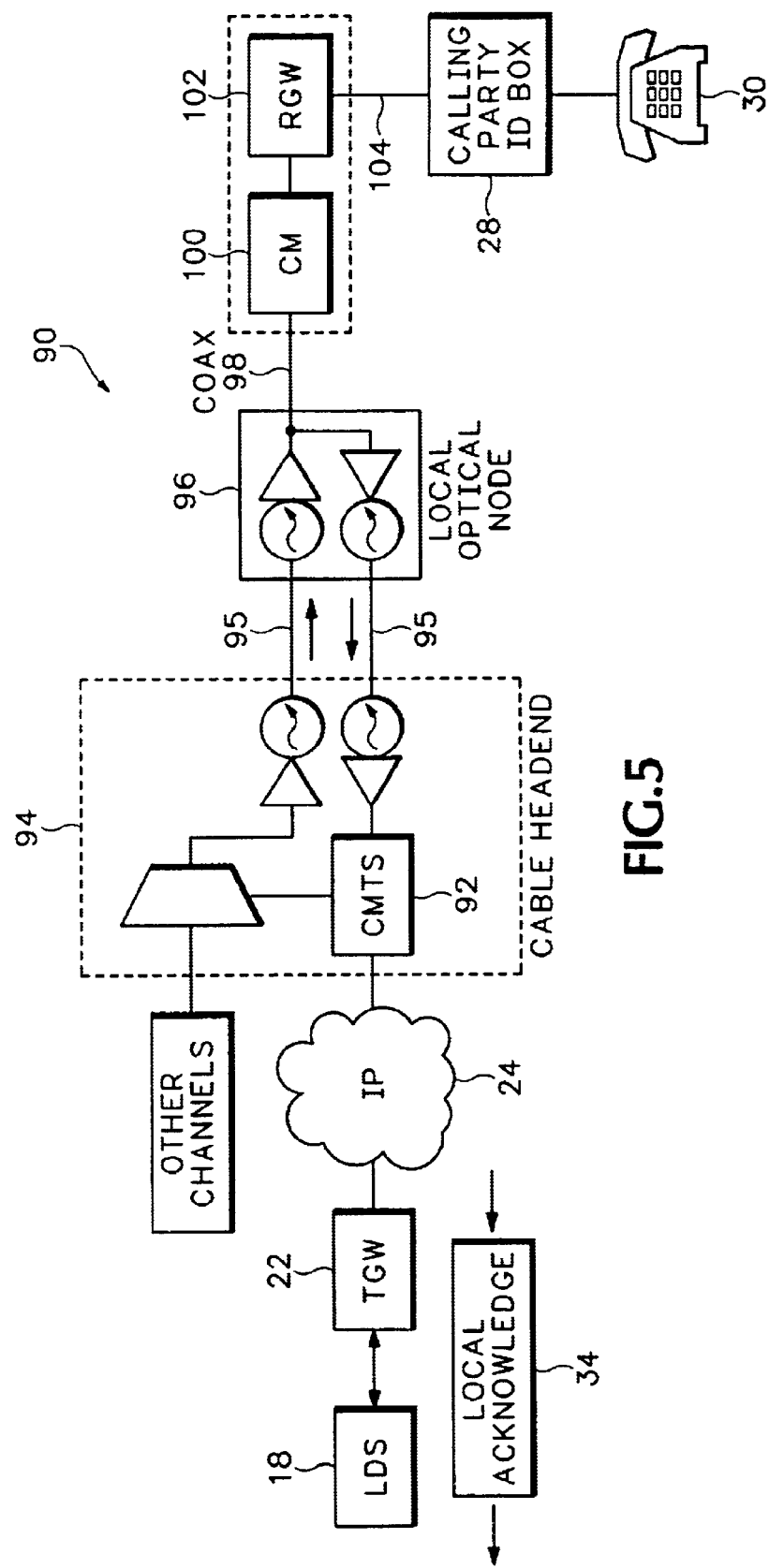
FIG. 5 is a block diagram showing the invention implemented in a High Speed Fiber Cable network.

FIG. 5 is a block diagram showing how the invention is used in a cable modem network 90. A cable headend 94 includes a Cable Modem Termination System (CMTS) 92 located at a cable company central location. In newer cable installations, the headend 94 connects first to a local optical node 96 over a long haul fiber optic link 95. The local node 96 then converts from the fiber optic link 95 to a coaxial cable and distributes cable services to a local area of subscribers. This is referred to as a Hybrid Fiber Coax (HFC) plant.

The cable 98 enters the subscribers premises and is terminated in a cable modem 100. The cable modem 100 terminates the layer 1 and layer 2 cable protocols and connects to the Remote Gateway (RGW) 102. Alternatively, the CM 100 and RGW 102 may reside within the same enclosure. The RGW 102 connects through a Plain Old Telephone Service (POTS) line 104 to the caller ID box 28 and telephone 30.

In a dense residential area, the local node 96 might have 2 to 4 main coaxial cable (coax) runs 98 that support a total of 300 to 500 subscribers (homes) within a 1 to 2 mile radius. Less dense areas have less homes and a larger radius. The long haul link 95 is typically between 0 to 13 miles. Each local node 96 has its own unique upstream path. Older cable wiring plants do not have local nodes 96 and drive main cable runs directly from the head end 94.

The trunk gateway 22 is coupled to the cable headend 94 through an IP network 24. The residential gateway 102 is located at the end of the HFC network. The functions provided by the TGW 22 and RGW 100 are the same as described above with the TGW 22 generating the local caller ID box acknowledge 34.

Having described and illustrated the principles of the invention in a preferred embodiment thereof, it should be apparent that the invention can be modified in arrangement and detail without departing from such principles. I claim all modifications and variations coming within the spirit and scope of the following claims.

What is claimed is:

1. A gateway, comprising:
a signal detector configured to detect an indication signal directed to a caller ID box, the indication signal identifying presence of a call waiting call to a destination phone number associated with the caller ID box and the signal detector detecting the indication signal at an intermediate gateway location in a call path to the caller ID box between a circuit switched network originating the indication signal and a packet switched network further transporting the indication signal from the circuit switched network toward the caller ID box; and
a controller configured to generate a local acknowledge signal from the intermediate gateway location on behalf of the caller ID box when the indication signal is detected at the intermediate gateway location prior to the caller ID box receiving the indication signal over the packet switched network.

2. A gateway according to claim 1 wherein the gateway includes a first interface to couple to a circuit switched network and a second interface to couple to an IP network.

3. A gateway according to claim 1 wherein the controller breaks an upstream voice channel when the indication signal is detected to stop propagation of a remote caller ID box acknowledge.

4. A gateway, comprising:
a signal detector to detect an indication signal directed to a caller ID box, the indication signal identifying presence of a call waiting call to a destination phone number; and
a controller to generate a local acknowledge signal when the indication signal is detected independently of any caller ID box that may be located at the destination phone number, and wherein the controller breaks a downstream voice channel and then reestablishes the downstream voice channel after a remote acknowledge signal is detected from the caller ID box.

5. A gateway according to claim 4 wherein the downstream voice channel collects FSK signals representing information about the call waiting call and converts the FSK signals into IP message packets.

6. A gateway according to claim 5 wherein the controller forwards the IP message packets to the caller ID box only when the remote acknowledge signal is detected from the caller ID box.

7. A gateway according to claim 1 wherein the gateway is a trunk gateway that receives the indication signal from a Local Digital Switch and generates the local acknowledge signal back to the Local Digital Switch.

8. A gateway, comprising:
a signal detector to detect an indication signal directed to a caller ID box, the indication signal identifying presence of a call waiting call to a destination phone number;
a controller to generate a local acknowledge signal when the indication signal is detected independently of any caller ID box that may be located at the destination phone number, wherein the gateway is a trunk gateway that receives the indication signal from a Local Digital Switch and generates the local acknowledge signal back to the Local Digital Switch; and
a residential gateway coupled between the trunk gateway and the caller ID box, the residential gateway forwarding signaling identifying the call waiting call to the caller ID box only when a remote acknowledge signal is detected from the caller ID box.

9. A gateway according to claim 8 wherein the signaling comprises FSK signals, the controller converting the FSK signals into digital data and sending the digital data as IP packets to the residential gateway, the residential gateway converting the digital data in the IP packets back into FSK signals and sending the FSK signals to the caller ID box.

10. A method for conducting call waiting caller ID signaling in a packet switched network, comprising:
- detecting an indication signal indicating a second phone call to a destination phone number already conducting a first phone call;
- detecting the indication signal at an intermediate network location between a circuit switched network sending the indication signal and a packet switched network located between the circuit switched network and a caller ID box at the destination phone number;
- generating a local acknowledge signal at the intermediate network location imitating an actual acknowledge signal that would be generated from the caller ID box at the destination phone number; and
- managing call waiting caller ID signaling for the destination phone number locally at the intermediate network location to comply with circuit switched network acknowledge timing for the call waiting caller ID signaling and managing other call waiting caller ID signaling remotely from the caller ID box.

11. A method according to claim 10 including receiving the indication signal from a Local Digital Switch and generating the imitated acknowledge signal back to the Local Digital Switch.

12. A method according to claim 10 including temporarily disconnecting an upstream voice path between an IP network and a circuit switched network when the indication signal is detected.

13. A method according to claim 10 including:
- monitoring for FSK signals providing information about the second phone call;
- monitoring for an actual acknowledge signal generated from the caller ID box; and
- forwarding the FSK signals to the caller ID box only when the actual acknowledge signal is detected.

14. A method for conducting call waiting caller ID signaling in a packet switched network, comprising:
- receiving an indication signal indicating a second phone call to a destination phone number already conducting a first phone call;
- generating a local acknowledge signal imitating an actual acknowledge signal that would be generated from a caller ID box at the destination phone number;
- managing call waiting caller ID signaling for the destination phone number remotely from the caller ID box;
- monitoring for FSK signals providing information about the second phone call;
- monitoring for an actual acknowledge signal generated from the caller ID box;
- forwarding the FSK signals to the caller ID box only when the actual acknowledge signal is detected; and
- disconnecting a downstream voice channel to the destination phone number while the FSK signals are being forwarded to the caller ID box and then reconnecting the downstream voice channel to the destination phone number.

15. A method according to claim 13 including:
- accumulating all of the FSK signals;
- converting the FSK signals into digital data;
- formatting the digital into IP packets; and
- sending the IP packets to a residential gateway for converting back into FSK signals.

16. A method according to claim 13 including generating the local acknowledge signal at a trunk gateway and controlling the propagation of the FSK signals to the caller ID box at a residential gateway.

17. Computer code stored on a computer readable medium and executable by a processor, comprising:
- code to detect an indication signal indicating a call waiting call to a destination phone number already conducting a phone call;
- code to detect the indication signal at an intermediate network location between a circuit switched network sending the indication signal and a packet switched network transferring the indication signal further on toward a caller ID box at the destination phone number;
- code to generate a local acknowledge signal at the intermediate network location imitating an actual acknowledge signal that would be generated from a caller ID box at the destination phone number; and
- code to manage call waiting caller ID signaling for the destination phone number locally at the intermediate network location to comply with circuit switched network acknowledge timing for the call waiting caller ID signaling independently from the caller ID box.

18. Computer code according to claim 17 including:
- code to detect the indication signal from a circuit switched network Local Digital Switch; and
- code to generate the local acknowledge signal back to the Local Digital Switch.

19. Computer code according to claim 17 including code to disconnect an upstream voice path between an IP network and a circuit switched network when the indication signal is detected.

20. Computer code according to claim 17 including:
- code to monitor for FSK signals providing information about the call waiting call;
- code to monitor for an actual acknowledge signal generated from the caller ID box; and
- code to forward the FSK signals to the caller ID box only when the acknowledge signal is detected.

21. Computer code according to claim 20 including:
- code to accumulate all of the FSK signals;
- code to convert the FSK signals into digital data;
- code to format the digital data into IP packets; and
- code to send the IP packets to a residential gateway for converting back into FSK signals.

22. Computer code according to claim 21 wherein the code to generate the local caller ID box acknowledge is located in a trunk gateway and the code to control forwarding of the FSK signals to the caller ID box is located in a residential gateway.

23. A system for conducting a call waiting caller ID signaling protocol, comprising:
- means for detecting an indication signal indicating a second phone call to a destination phone number already conducting a first phone call;
- means for generating a local acknowledge signal from an intermediate network location that initiates caller ID information signaling to a caller ID box independently of the caller ID box while forwarding the caller ID information on to the caller ID box, the intermediate network location located between a circuit switched network generating the indication signal and a packet switched network forwarding the call ID information on towards the caller ID box;
- means for detecting an actual acknowledge signal from the caller ID box; and means for controlling the connection and disconnection of voice channels according to the detected indication signal, local acknowledge signal and actual acknowledge signal.

24. A system according to claim 23 including means for disconnecting a downstream voice channel to the destination phone number while Frequency Shift Keying (FSK) signals are being forwarded to the caller ID box and then reconnecting the downstream voice channel to the destination phone number.

25. A system according to claim 24 including means for disconnecting an upstream voice path between the packet switched network and the circuit switched network when the indication signal is detected.

26. A system according to claim 25 including:
- means for monitoring for FSK signals providing information about the call waiting call;
- means for monitoring for an actual acknowledge signal generated from the caller ID box; and
- means for forwarding the FSK signals to the caller ID box only when the acknowledge signal is detected.

* * * * *